United States Patent
Suneya

(10) Patent No.: US 8,930,755 B2
(45) Date of Patent: Jan. 6, 2015

(54) DISTRIBUTION APPARATUS AND DISTRIBUTION METHOD

(75) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 13/316,976

(22) Filed: Dec. 12, 2011

(65) Prior Publication Data

US 2012/0151261 A1 Jun. 14, 2012

(30) Foreign Application Priority Data

Dec. 14, 2010 (JP) ................ 2010-278567

(51) Int. Cl.
  *G06F 11/00* (2006.01)
  *H04L 1/00* (2006.01)

(52) U.S. Cl.
  CPC ............. *H04L 1/0009* (2013.01); *H04L 1/0025* (2013.01); *H04L 1/0026* (2013.01); *H04L 2001/0093* (2013.01)
  USPC ................ 714/18; 714/4.1; 714/16

(58) Field of Classification Search
  CPC . G06F 11/14; G06F 11/1402; G06F 11/1412; G06F 11/1443; G06F 11/1474
  USPC ............... 714/4.1, 15, 16, 20, 49, 18
  See application file for complete search history.

(56) References Cited

U.S. PATENT DOCUMENTS

| | | | | |
|---|---|---|---|---|
| 6,141,785 A | * | 10/2000 | Hur et al. | 714/18 |
| 7,100,078 B1 | * | 8/2006 | Pass | 714/18 |
| 7,536,622 B2 | * | 5/2009 | Leon et al. | 714/18 |
| 2001/0037472 A1 | * | 11/2001 | Li | 714/4 |

FOREIGN PATENT DOCUMENTS

| | | |
|---|---|---|
| JP | 2006-174298 A | 6/2006 |
| JP | 2008-283283 A | 11/2008 |
| JP | 2010-516119 A | 5/2010 |
| JP | 4532505 B2 | 8/2010 |

* cited by examiner

*Primary Examiner* — Joseph D Manoskey
(74) *Attorney, Agent, or Firm* — Canon USA Inc. IP Division

(57) ABSTRACT

A distribution apparatus for distributing content data items via multicast includes a transmitting and receiving unit and an error correction encoding unit. The transmitting and receiving unit receives reception status information regarding a reception status of the content data items in a receiving apparatus that receives the content data items. The error correction encoding unit generates recovery data used by the receiving apparatus to recover a content data item that is not successfully received among the content data items on the basis of reception status information received from the receiving apparatus that receives the content data items distributed via multicast. Subsequently, the transmitting and receiving unit distributes the generated recovery data together with the content data items via multicast.

10 Claims, 7 Drawing Sheets

FIG. 3

```
SET_PARAMETER rtsp://example.com/misc/foo RTSP/1.0
CSeq: 110
Content-length: 231
Content-Type: application/sdp v=0
o=- 289083124 289083124 IN IP4 192.12.34.567
s=Video Session
t=0 0
a=group:FEC 1 2          ← 303
m=video 5000/2 RTP/AVP 100
c=IN IP4 224.2.0.1/32
a=rtpmap:100 H264/90000
a=mid:1
m=video 5000 RTP/AVP 103
c=IN IP4 224.2.0.2/32
a=rtpmap:103 fec/90000
a=mid:2
```

300 encompasses all; 301 is the first m=video block; 302 is the second m=video block.

FIG. 6

```
v=0
o=- 289083124 289083124 IN IP4 192.12.34.567
s=Video Session
t=0 0
a=group:FEC 1 2 3
```

601:
```
m=video 5000/2 RTP/AVP 100
c=IN IP4 224.2.0.1/32
a=rtpmap:100 H264/90000
a=mid:1
```

602:
```
m=video 5000 RTP/AVP 103
c=IN IP4 224.2.0.2/32
a=rtpmap:103 fec1/90000
a=mid:2
```

603:
```
m=video 5000 RTP/AVP 104
c=IN IP4 224.2.0.3/32
a=rtpmap:104 fec2/90000
a=mid:3
```

DISTRIBUTION APPARATUS AND DISTRIBUTION METHOD

BACKGROUND OF THE INVENTION

1. Field of the Invention

The present invention relates to an apparatus and a method for distributing data over a wired or wireless network.

2. Description of the Related Art

In recent years, a technology for distributing streaming multi-media data, such as moving image data and audio data, using an IP network and allowing a user to view the streaming multi-media data has been developed.

In particular, in order to distribute real-time multimedia data, such as live video, a communication protocol called a transport protocol for real-time application (RTP) is widely used.

RTP is a protocol used for transferring data (primarily, audio data and a moving image) in real time. RTP is defined as RFC3550 by IETF (Internet Engineering Task Force).

RTP is a higher-layer protocol of UDP (user datagram protocol) which is a connectionless protocol. A communication process using RTP is relatively simple. Accordingly, the communication speed could be increased. However, a communication error is not recovered. Thus, if a packet is lost in a communication path, data reconstruction in a receiving apparatus may be interrupted.

In order to avoid a communication error when data is transmitted using RTP, FEC (forward error correction) has been developed. In FEC, data for recovery (FEC data) is generated using an error correction encoding technology, and a receiving apparatus corrects an error occurring in communication data using the FEC data.

Among existing techniques, a technique in which a data transmitting apparatus transmits a plurality of FEC streams at different redundancy levels together with a media stream and a data receiving apparatus recovers lost media data using one or more of the FEC streams (refer to, for example, Japanese Patent No. 4532505) has been developed. The data receiving apparatus recovers a lost media packet using an FEC packet selected on the basis of the sequence number included in each of the media packets.

However, in multicast distribution, in some cases, a receiving apparatus that receives distributed data may not use the redundancy data suitable for the receiving apparatus.

For example, when a plurality of redundancy data items having different redundancy levels are distributed via multicast and if the receiving apparatus that receives distributed data cannot determine which redundancy data item should be received using, for example, an error rate, the receiving apparatus may not use the redundancy data item suitable for the receiving apparatus.

In addition, for example, if the receiving apparatuses employ different FEC data generation techniques, one of the receiving apparatus that receives multicast distribution data may not use redundancy data corresponding to the FEC data generation technique thereof.

SUMMARY OF THE INVENTION

Accordingly, the present invention provides a distribution apparatus and a distribution method that allow a receiving apparatus that receives multicast distribution data to use recovery data more suitable for the receiving apparatus.

According to an embodiment of the present invention, a distribution apparatus for distributing content data items via multicast is provided. The distribution apparatus includes a receiving unit configured to receive reception status information regarding a reception status of the content data items in a receiving apparatus that receives the content data items distributed via multicast, a generating unit configured to generate recovery data used by the receiving apparatus in recovering a content data item that is not successfully received among the content data items on the basis of the reception status information received from the receiving apparatus that receives the content data items distributed via multicast, and a distributing unit configured to distribute the generated recovery data together with the content data items via multicast.

According to another embodiment of the present invention, a distribution apparatus for distributing content data items via multicast is provided. The distribution apparatus includes a generating unit configured to generate recovery data used by a receiving apparatus in recovering a content data item that is not successfully received by the receiving apparatus among the content data items, a distributing unit configured to distribute the generated recovery data together with the content data items via multicast, and a sending unit configured to send identification information for identifying the recovery data item to the receiving apparatus so that the receiving apparatus receives the recovery data item distributed via multicast.

According to the present invention, a receiving apparatus can use recovery data that is more suitable for the receiving apparatus.

Further features of the present invention will become apparent from the following description of exemplary embodiments with reference to the attached drawings.

BRIEF DESCRIPTION OF THE DRAWINGS

FIG. 3 illustrates an example of a message used to send SDP information using the SET_PARAMETER method of RTSP.

FIG. 6 is an example of an SDP description used to send session information.

DESCRIPTION OF THE EMBODIMENTS

Exemplary embodiments of the present invention are described in detail below with reference to the accompanying drawings. It should be understood that the configurations described in these embodiments are merely for illustrative purposes only and are not meant to be limiting on the scope of the appended claims.

First Exemplary Embodiment

The configuration of a computer apparatus serving as a distribution apparatus or a receiving apparatus according to the present embodiment is described next with reference to a block diagram illustrated in FIG. 1.

Figure 1:
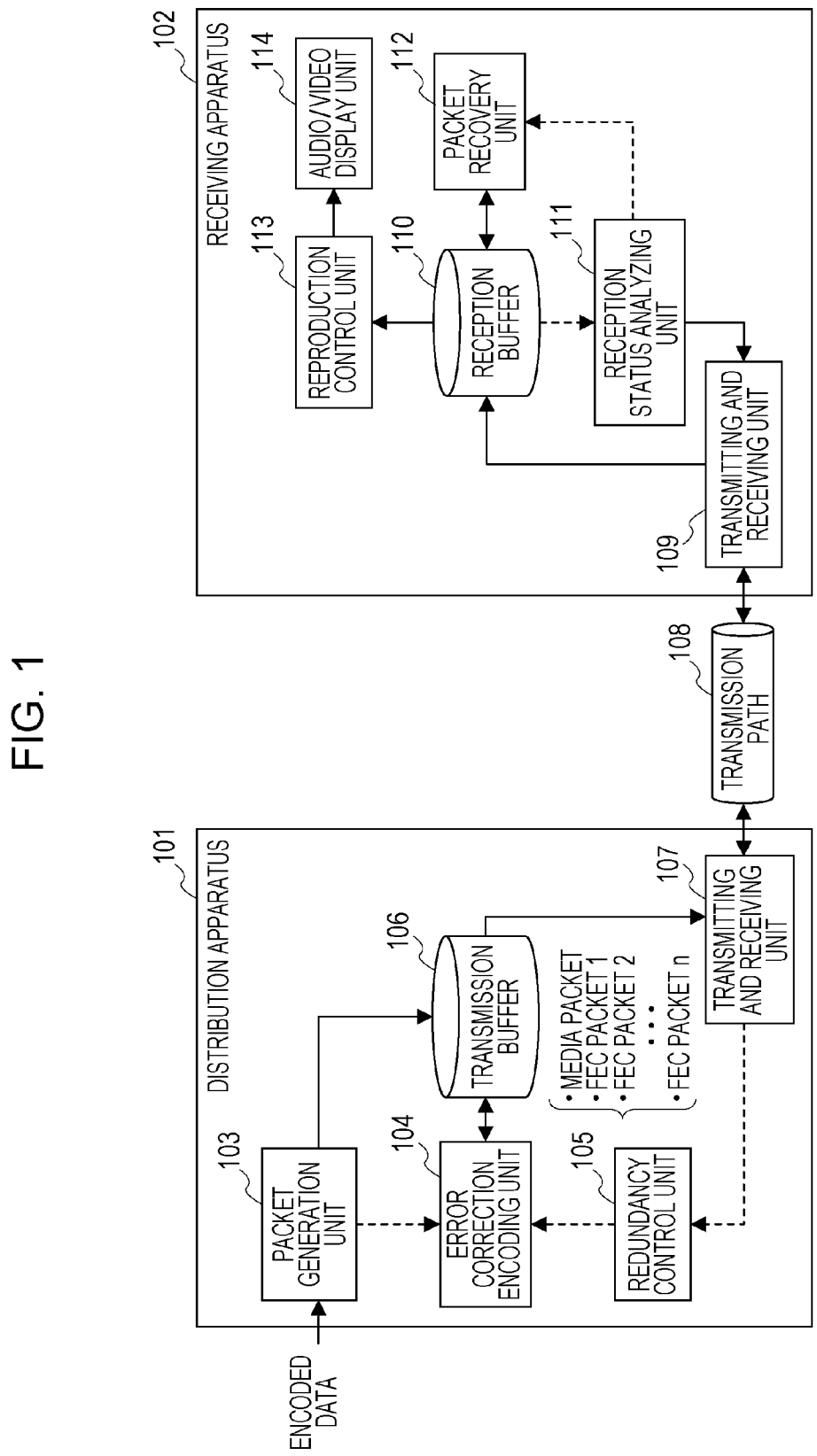
FIG. 1 is a block diagram of the basic structures of a distribution apparatus and a receiving apparatus according to an embodiment of the present invention.

As illustrated in FIG. 1, a distribution apparatus 101 is connected to a receiving apparatus 102 via a transmission path 108. Note that a plurality of the distribution apparatuses 101 can be connected to a plurality of the receiving apparatuses 102.

Each of the distribution apparatus 101 and the receiving apparatus 102 may be formed from a single computer apparatus. Alternatively, each function of each of the distribution apparatus 101 and the receiving apparatus 102 may be realized by a computer apparatus. When each of the distribution apparatus 101 and the receiving apparatus 102 is formed from a plurality of computer apparatuses, the computer apparatuses are connected to one another using, for example, a local area network (LAN) so as to communicate with one another.

As illustrated in FIG. 1, the distribution apparatus 101 includes a packet generation unit 103, an error correction encoding unit 104, a redundancy control unit 105, a transmission buffer 106, and a transmitting and receiving unit 107.

The packet generation unit 103 divides encoded content data received from the outside into data items having sizes appropriate for communication. The packet generation unit 103 further adds a header required for the communication to the data item. Thus, the packet generation unit 103 generates an RTP data packet.

While the present exemplary embodiment is described with reference to content data formed from moving image data or audio data, the present invention is applicable to data other than moving image data and audio data. In addition, while the present exemplary embodiment is described with reference to data transmission using the RTP protocol, the present invention is applicable to data communication using another protocol. Furthermore, the distribution apparatus 101 may further include an image capturing unit, a microphone, and an encoding unit for encoding moving image data and audio data.

The error correction encoding unit 104 generates a recovery packet (an FEC packet) using the redundancy sent from the redundancy control unit 105 (describe in more detail below) and packet data generated by the packet generation unit 103. The FEC packet serves as recovery data used by the receiving apparatus 102 in recovering content data that is not successfully received. The error correction encoding unit 104 generates the FEC packet through, for example, an exclusive-OR operation performed on the content data.

The transmission buffer 106 temporarily stores the packet generated by the packet generation unit 103 and the FEC packet generated by the error correction encoding unit 104.

The transmitting and receiving unit 107 distributes, through the transmission path 108, the multicast data packet and FEC packet stored in the transmission buffer 106. In addition, the transmitting and receiving unit 107 receives a packet transmitted from the receiving apparatus 102 through the transmission path 108. Examples of the packet received by the transmitting and receiving unit 107 include a receiver report (reception status information) indicating the reception status of the data packet (content data) received by the receiving apparatus 102. According to the present exemplary embodiment, the receiving apparatus 102 uses the RTP control protocol (RTCP) as a protocol used for communication of the receiver report. RTCP is defined in RFC3550 and is primarily used for a transmitter and a receiver using RTP to communicate a data transmission and reception status. The receiver report is described in more detail below.

The transmission path 108 is a transmission path represented by one of a variety of networks. According to the exemplary present embodiment, the transmission path 108 is a network for transmitting packetized moving image and audio data.

The redundancy control unit 105 determines the redundancy of FEC data on the basis of a receiver report received by the transmitting and receiving unit 107. Thereafter, the redundancy control unit 105 sends the determined redundancy to the error correction encoding unit 104. A technique used by the redundancy control unit 105 to determine the redundancy is described in more detail below.

The exemplary configuration of the receiving apparatus 102 is described next.

The receiving apparatus 102 includes a transmitting and receiving unit 109, a reception buffer 110, a reception status analyzing unit 111, a packet recovery unit 112, a reproduction control unit 113, and an audio/video display unit 114.

The transmitting and receiving unit 109 receives a data packet and an FEC packet distributed from the distribution apparatus 101 via multicast. The transmitting and receiving unit 109 temporarily stores, in the reception buffer 110, the data packet and the FEC packet received from the distribution apparatus 101.

In addition, the transmitting and receiving unit 109 receives a packet destined for the distribution apparatus 101. For example, the packet destined for the distribution apparatus 101 includes a receiver report indicating the reception status of the data packet received by the receiving apparatus 102.

The reception status analyzing unit 111 analyzes the reception status on the basis of the packets stored in the reception buffer 110. According to the present exemplary embodiment, the reception status analyzing unit 111 monitors the sequence numbers of the data packets and the FEC packets and determines a packet loss ratio by identifying a lost packet lost in, for example, the transmission path 108. The sequence number represents sequential number information inserted into the header of each packet. Note that according to the present exemplary embodiment, the packet loss ratio is used as information indicating the reception status. However, an amount of error in content data may be used as information indicating the reception status. The reception status analyzing unit 111 generates a receiver report on the basis of the determined packet loss ratio and sends information regarding the lost packet to the packet recovery unit 112. The receiver report is transmitted from the transmitting and receiving unit 109 to the distribution apparatus 101.

The reception status analyzing unit 111 analyzes the reception status and generates the receiver report at predetermined intervals. The redundancy control unit 105 of the distribution apparatus 101 controls the redundancy of the FEC data on the basis of the receiver report generated at the predetermined intervals. However, the receiver report is not necessarily generated at predetermined intervals.

Upon receiving the information regarding the lost packet from the reception status analyzing unit 111, the packet recovery unit 112 generates the lost packet using the FEC packet and data packets that have been successfully received. That is, among the data packets (the content data) distributed via multicast, the packet recovery unit 112 recovers content data that is not successfully received by the receiving apparatus 102 using the FEC packet (the recovery data). The recovery packet generated by the packet recovery unit 112 is stored in the reception buffer 110.

The reproduction control unit 113 decodes encoded data in the data packet stored in the reception buffer 110. The decoded data is delivered to the audio/video display unit 114.

The audio/video display unit 114 reproduces the decoded data. For example, the audio/video display unit 114 outputs the decoded audio data to a speaker and outputs the decoded video data to a display.

The receiver report is described in more detail next with reference to FIG. 7.

According to the present exemplary embodiment, the reception status analyzing unit 111 uses RTCP as a protocol for communication of the receiver report. Examples of RTCP packets include a receiver report (RR) packet, a sender report (SR) packet, a source description (SDES) packet, a membership management packet (e.g., a Goodbye packet), and an application defined (APP) packet. According to the present exemplary embodiment, in order to recognize the reception status, the receiver report packet of RTCP is used.

Figure 7:
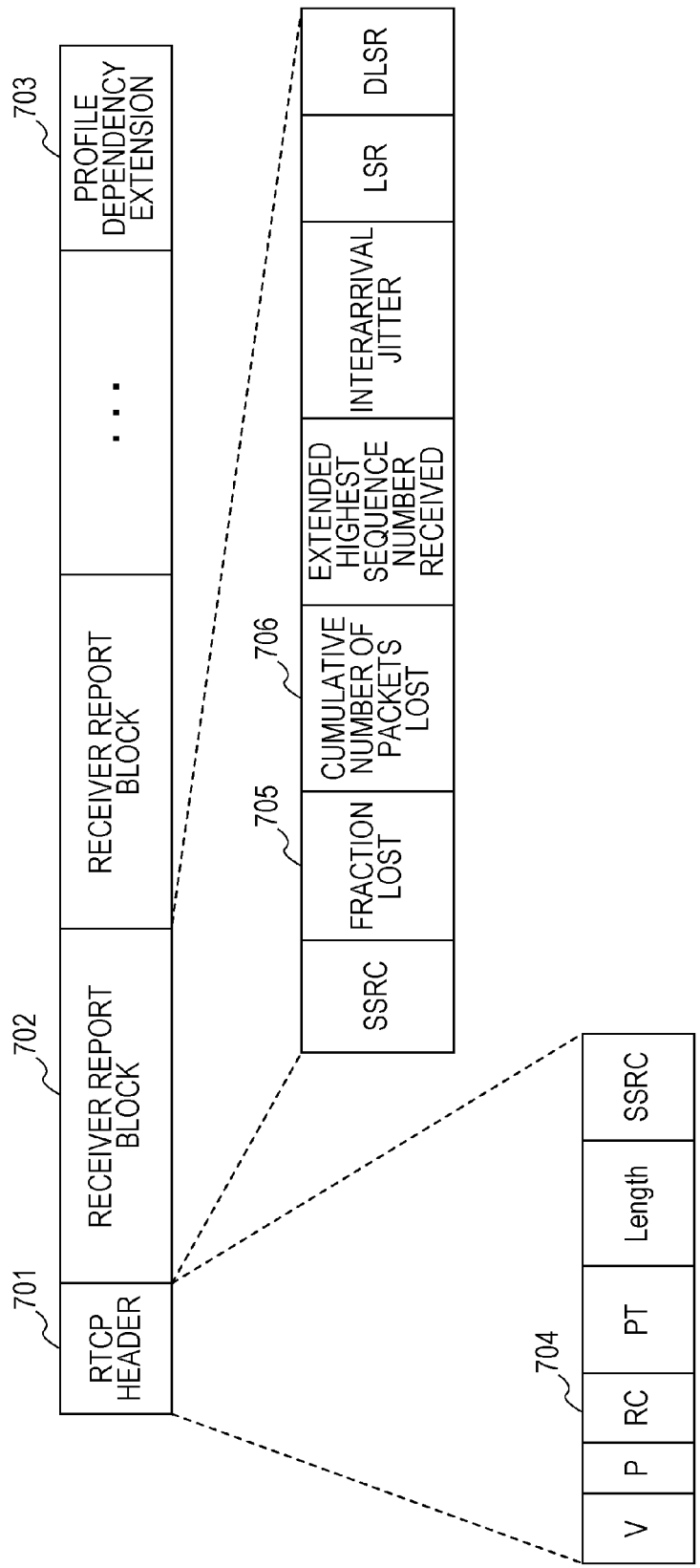
FIG. 7 illustrates the structure of a receiver report.

As illustrated in FIG. 7, the receiver report (the reception status information) includes an RTCP header 701, a receiver report block 702, and a profile dependency extension 703. A number of the receiver report blocks 702 equal to the number indicated by an RC (reception report count) 704 are included.

The structure of the receiver report block 702 is described next.

"Fraction lost" 705 indicates the ratio of the number of RTP packets lost over the interval between generation of the previous receiver report and generation of the current receiver report to the number of RTP packets expected.

"Cumulative number of packets lost" 706 indicates a value indicating the total number of RTP packets over the interval from beginning of communication to generation of a receiver report.

The reception status analyzing unit 111 generates a receiver report including the fraction lost 705 and the cumulative number of packets lost 706.

The receiver report generated by the reception status analyzing unit 111 is transmitted to the distribution apparatus 101 by the transmitting and receiving unit 109. The redundancy control unit 105 of the distribution apparatus 101 determines the redundancy of the generated FEC data on the basis of the receiver reports received from a plurality of the receiving apparatuses 102.

A technique used by the redundancy control unit 105 to determine the redundancy is described in detail next. Upon receiving the receiver reports from a plurality of the receiving apparatuses 102, the redundancy control unit 105 determines a plurality of redundancies in accordance with the received information and sends the redundancies to the error correction encoding unit 104.

Figure 2:
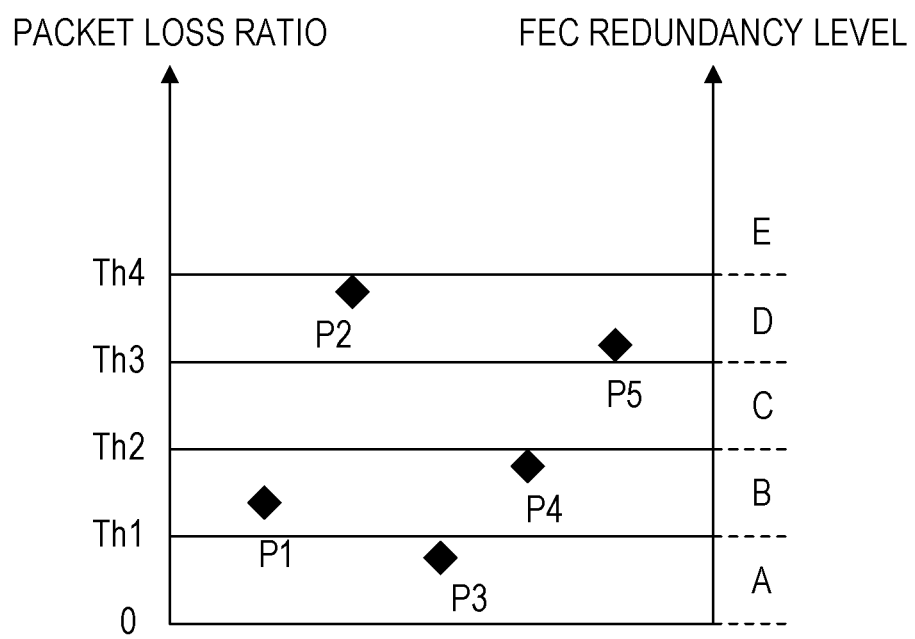
FIG. 2 illustrates an example of setting of an FEC redundancy level using the packet loss ratio.

FIG. 2 illustrates the packet loss ratios of a plurality of receiving apparatuses 102 that receive multicast distribution data and the redundancy levels corresponding to the packet loss ratios. The packet loss ratios illustrated in FIG. 2 are determined on the basis of the values of the fraction lost 705 included in the receiver reports.

In FIG. 2, the packet loss ratios of the receiving apparatuses 102 (i.e., receiving apparatuses P1 to P5) for a certain period of time during which the distribution apparatus 101 is distributing multicast content data to the receiving apparatuses 102 (P1 to P5) are shown. In addition, in FIG. 2, the redundancy level is set to one of five levels A to E. In this example, the packet loss ratio of the receiving apparatus P2 is the highest, and the packet loss ratio of the receiving apparatus P3 is the lowest. The redundancy control unit 105 determines the plurality of redundancies so that the redundancy (the level B) of the FEC data for the receiving apparatus P1 is higher than the redundancy (the level A) of the FEC data for the receiving apparatus P3. That is, when the error correction encoding unit 104 receives a first receiver report from a first receiving apparatus and receives, from a second receiving apparatus, a second receiver report indicating a loss ratio higher than that of the first receiver report, the error correction encoding unit 104 generates FEC data items having different redundancies as follows. That is, the error correction encoding unit 104 generates a first FEC data item for the first receiving apparatus and a second FEC data item having an amount of recoverable data larger than that of the first FEC data.

In addition, in FIG. 2, since the packet loss ratio of the receiving apparatus P2 is almost the same as the packet loss ratio of the receiving apparatus P5, the same FEC data is selected as the FEC data items for the receiving apparatuses P2 and P5. That is, as can be seen from FIG. 2, three different redundancies (having the levels A, B, and D) are selected by the redundancy control unit 105. That is, the redundancy control unit 105 determines that it does not generate FEC data items for the redundancies having the levels C and E among the redundancies having the levels A, B, C, D, and E. In addition, in the example illustrated in FIG. 2, if the receiving apparatus P3 completes reception of the content data or if the packet loss ratio of the receiving apparatus P3 exceeds a predetermined threshold value Th1, the error correction encoding unit 104 completes generation of the FEC data for the redundancy level A. In this way, the load for generating an FEC data item that is not used by any receiving apparatus that receives distributed multicast data can be eliminated.

Alternatively, the redundancy control unit 105 may generate only recovery data corresponding to the reception status information item having the largest amount of data that are not successfully received (the largest amount of error) among the reception status information items received from the receiving apparatuses connected to the distribution apparatus 101. In the example illustrated in FIG. 2, the redundancy control unit 105 may determine that it generates only the FEC data corresponding to the reception status information item regarding the receiving apparatus P2 (i.e., the FEC data for the redundancy level D) among the reception status information items received from the receiving apparatuses P1 to P5. In this way, if a plurality of reception status information items are received from the receiving apparatuses that receive a multicast distribution packet, the error correction encoding unit 104 generates the recovery data used by the plurality of receiving apparatuses on the basis of the reception status information item indicating the largest amount of data that are not successfully received among the plurality of reception status information items.

By doing so, an FEC data item that is applicable to all of the receiving apparatuses connected to the distribution apparatus 101 can be determined. In the example illustrated in FIG. 2, it can be determined that the FEC data item for the redundancy level D of the five levels is applicable to all of the receiving apparatuses. In this way, the load required for generating the FEC data items other than that for the redundancy level D can be eliminated. Furthermore, the communications traffic for transmitting the generated FEC data can be reduced. In the example illustrated in FIG. 2, the need for generating the FEC data item for the redundancy level E having the amount of recovery data larger than that for the redundancy level D can be eliminated. Accordingly, as compared with the case in which the FEC data having the highest redundancy level is always generated and transmitted, the communications traffic required for transmitting the data can be reduced.

While the present exemplary embodiment has been described with reference to FIG. 2 in which five redundancy levels are employed, the number of the redundancy levels is not limited to five. In addition, while the present exemplary embodiment has been described with reference to the example in which the redundancy level is determined using the packet loss ratio, the determination technique is not limited thereto. For example, the redundancy level may be determined on the basis of the amount of data that is not successfully received by the receiving apparatus 102 (i.e., the amount of error) for a certain period of time. The redundancy control unit 105 can acquire the amount of error using the fraction lost 705 included in the receiver report.

For example, when content data is distributed to first to third receiving apparatuses 102 via multicast and if, for a certain period of time, the amount of error in the first receiving apparatus is lower than a predetermined threshold value and each of the amounts of error in the second and third receiving apparatuses is higher than the predetermined threshold value, the FEC data is generated as follows. That is, the error correction encoding unit 104 generates FEC data for the first receiving apparatus having the amount of error that is lower than the predetermined threshold value. In addition, the error correction encoding unit 104 generates FEC data for each of the second and third receiving apparatuses having the amount of error that is higher than the predetermined threshold value.

In addition, if the first receiving apparatus completes reception of the content data, the error correction encoding unit 104 completes generation of the FEC data for the first receiving apparatus.

Furthermore, in addition to the FEC data, the error correction encoding unit 104 of the distribution apparatus 101 generates session information including identification information for identifying the FEC data to be received by specific one of the receiving apparatuses 102. Note that according to the present exemplary embodiment, the error correction encoding unit 104 generates session information while following the SET_PARAMETER method defined in RTSP (Real Time Streaming Protocol). However, the technique for generating the session information is not limited thereto. Note that RTSP is a protocol used for controlling a session when, for example, data communication is performed using RTP. RTSP is defined in RFC2326 by IETF. In addition, SET_PARAMETER is a method used for mutually requesting setting of a parameter between a transmitter and a receiver.

FIG. 3 illustrates an example of description of the session information following the SET_PARAMETER method. The session information is described using a protocol called SDP (Session Description Protocol). SDP is a protocol for describing the information regarding a session for data communication when the session is established using a protocol, such as RTSP. SDP is defined in RFC4566 by IETF.

In FIG. 3, session information 300 is described using SDP. The session information 300 includes content information 301, FEC information 302, and a description section 303. The FEC information 302 is identification information for the receiving apparatus 102 to receive the FEC data distributed via multicast. The session information 300 indicates that the content data corresponding to the content information 301 is recoverable by using the FEC data corresponding to the FEC information 302. Note that a method of describing the FEC information 302 is defined in RFC4756 by IETF (the method is an extension of SDP).

As illustrated in FIG. 3, the content information 301 indicates H.264 multicast stream information. The FEC information 302 indicates information regarding the FEC data for protecting the stream indicated by the content information 301. According to the present exemplary embodiment, the distribution apparatus 101 distributes the FEC data via multicast.

That is, the session information 300 indicates that if a packet of the content data indicated by the content information 301 is lost, the lost packet can be recovered using the FEC data indicated by the FEC information 302.

According to the present exemplary embodiment, the error correction encoding unit 104 generates the session information including FEC information that is specific to each of the receiving apparatuses 102 in accordance with the reception status of the receiving apparatus 102. Thereafter, the transmitting and receiving unit 107 transmits the session information generated by the error correction encoding unit 104 to each of the receiving apparatuses 102.

For example, the transmitting and receiving unit 107 transmits, to the receiving apparatus P3, the session information corresponding to the FEC information 302 indicating the FEC data for the redundancy level A. In addition, the transmitting and receiving unit 107 transmits, to each of the receiving apparatuses P1 and P4, the session information corresponding to the FEC information 302 indicating the FEC data for the redundancy level B. In this way, each of the receiving apparatuses 102 can identify the FEC data item that matches the reception status of the receiving apparatus 102.

Note that the session information 300 illustrated in FIG. 3 includes the content information 301 and the FEC information 302. In addition to the content information 301 and the FEC information 302, the session information 300 may include audio data and other content information. Furthermore, while the present exemplary embodiment has been described with reference to the use of the RTSP SET_PARAMETER method, the method is not limited thereto.

An exemplary flow of processes performed by the distribution apparatus 101 and the receiving apparatus 102 is described next with reference to flowcharts illustrated in FIGS. 4 and 5.

Figure 4:
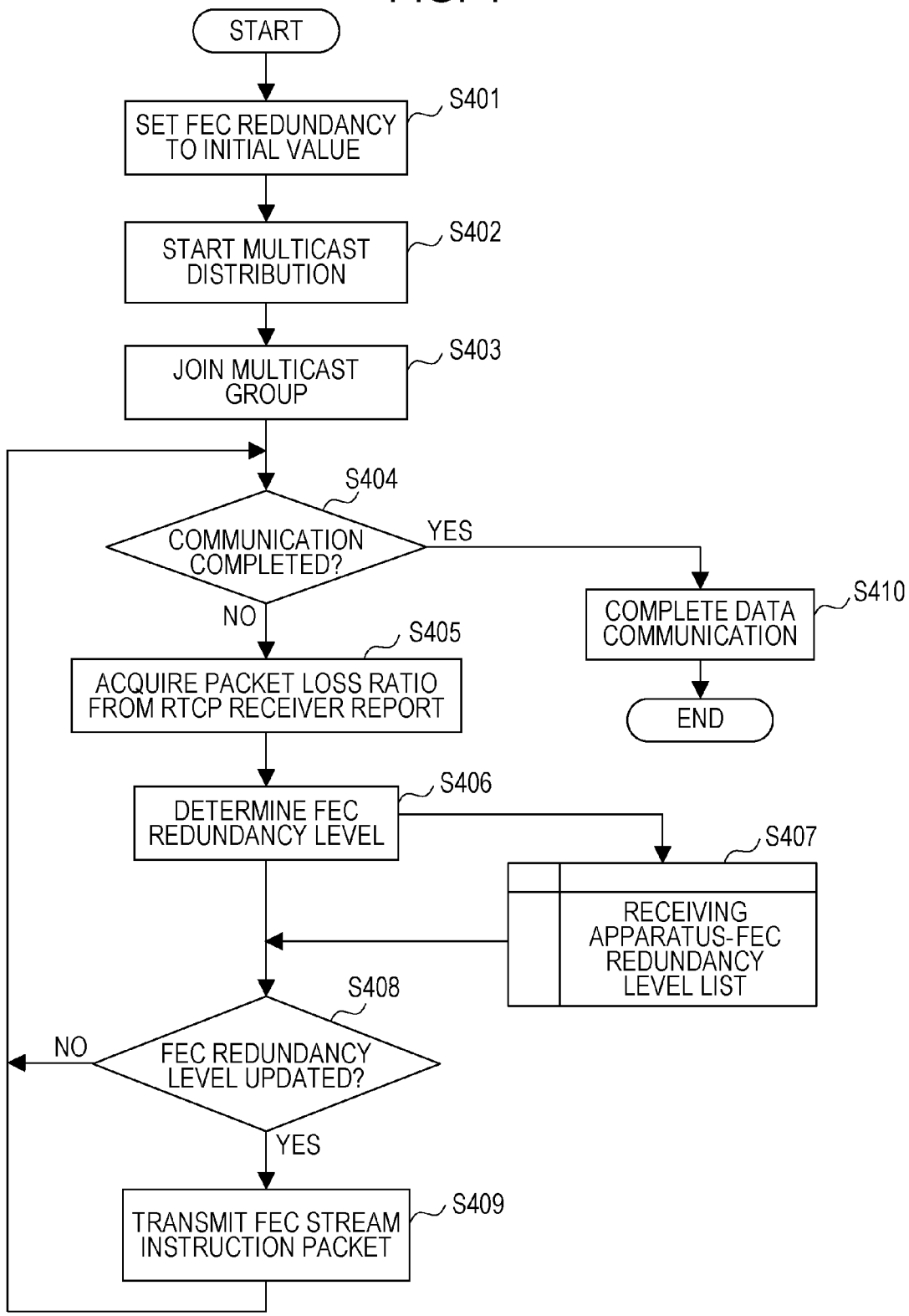
FIG. 4 is a flowchart of a process performed by the distribution apparatus.

FIG. 4 is a flowchart illustrating the flow of processes performed by the distribution apparatus 101. According to the present exemplary embodiment, the distribution apparatus 101 distributes content data via multicast. The process illustrated in FIG. 4 is realized by a central processing unit (CPU) of the distribution apparatus 101 that loads a program for the processes illustrated in FIG. 4 from a read only memory (ROM) to a random access memory (RAM) and executes the program. However, at least some of the processes illustrated in FIG. 4 can be executed by dedicated hardware. The processing illustrated in FIG. 4 is started when multicast distribution is started by the distribution apparatus 101. The multicast distribution is triggered by a request received from the receiving apparatus 102. However, even when the receiving apparatus 102 does not send the request, multicast distribution to the receiving apparatus 102 can be started in accordance with, for example, an operation performed on the distribution apparatus 101.

The redundancy control unit 105 of the distribution apparatus 101 sets the FEC redundancy to an initial value (step S401). The initial value of the FEC redundancy may be a constant value or the FEC redundancy determined when the previous multicast distribution is completed. In addition, in step S401, the transmitting and receiving unit 107 of the distribution apparatus 101 transmits the session information in response to a request from the receiving apparatus 102. The session information is used for the receiving apparatus 102 to receive content data and the FEC data distributed via multicast. After the transmitting and receiving unit 107 transmits the session information in response to the request from the receiving apparatus 102, the processing proceeds to step S402. Note that upon receiving the request for the session information after step S402, the transmitting and receiving unit 107 transmits the session information to the receiving apparatus 102 that sent the request.

The transmitting and receiving unit 107 starts multicast distribution of the data packets of the content data and the FEC packets of the FEC data (step S402).

According to the present exemplary embodiment, the transmitting and receiving unit 107 continues multicast distribution of the content data and the FEC data from step S402 to step S410 (distribution procedure).

The transmitting and receiving unit 107 joins a multicast group in order to receive data transmitted to the multicast address (step S403).

The transmitting and receiving unit 107 determines whether the multicast distribution of the content data is to be completed (step S404). If it is determined that the multicast distribution is to be completed, the transmitting and receiving unit 107 performs a completion process of the multicast distribution (step S410). Thus, the transmitting and receiving unit 107 completes the process.

However, if it is determined that the multicast distribution is not to be completed, the transmitting and receiving unit 107 receives a receiver report from the receiving apparatus 102 that receives the content data through multicast distribution (step S405). That is, in step S405 (reception procedure), the transmitting and receiving unit 107 receives the reception status information (the receiver report) regarding the reception status of the content data in the receiving apparatus 102 that receives the content data through the multicast distribution. In addition, in step S405, the redundancy control unit 105 obtains the packet loss ratio of each of the receiving apparatuses 102 on the basis of the receiver reports.

Subsequently, the redundancy control unit 105 determines the redundancy level of FEC for the receiving apparatus 102 that has transmitted the receiver report on the basis of the obtained packet loss ratio (step S406). For example, if the obtained packet loss ratio is less than Th1 illustrated in FIG. 2, the redundancy control unit 105 determines that the redundancy level of the FEC is "A". The error correction encoding unit 104 generates the FEC data for the redundancy level determined in step S406 (i.e., the redundancy level A) until the receiving apparatus 102 having the reception status corresponding to the redundancy level disappears (generation procedure). When the reception status of the receiving apparatus 102 is changed and, thus, the corresponding redundancy level is changed and if another receiving apparatus 102 corresponding to the redundancy level is not present, the redundancy control unit 105 completes generation of the FEC data for this redundancy level.

The redundancy control unit 105 stores a combination of the determined redundancy level and the receiving apparatus 102 (step S407).

Alternatively, in step S407, the redundancy control unit 105 may assign the highest redundancy level among a plurality of determined redundancy levels to all of the receiving apparatuses 102 and store the combinations. By doing so, the load required for generating FEC data other than the FEC data for the highest redundancy level among the determined redundancy levels can be eliminated. Furthermore, since only the FEC data for the highest redundancy level among the determined redundancy levels is transmitted, the communications traffic can be reduced when the generated FEC data are transmitted.

The redundancy control unit 105 determines whether the redundancy level determined in step S406 differs from the previous redundancy level (step S408). That is, the redundancy control unit 105 determines whether the redundancy level determined in the process performed in step S406 differs from the redundancy level determined in the process previously performed in step S406. In a process initially performed in step S408 since the processing illustrated in FIG. 4 was started, if the redundancy level determined in step S406 differs from the redundancy level that is initially set in step S401, the redundancy control unit 105 determines that the redundancy levels differ from each other. If it is determined that the redundancy levels differ from each other, the processing proceeds to step S409. However, if it is determined that the redundancy levels do not differ from each other, the processing returns to step S404.

The error correction encoding unit 104 generates session information including the FEC information 302 indicating the FEC data for the new redundancy level determined in step S406 (step S409). In addition, in step S409, the transmitting and receiving unit 107 transmits the session information generated by the error correction encoding unit 104 to the receiving apparatus 102 that sent the receiver report. Upon receiving the session information, the receiving apparatus 102 updates the received FEC data in accordance with the description in the session information. In this way, the FEC data that matches the reception status of the receiving apparatus 102 can be received.

While the present exemplary embodiment has been described with reference to sending of the FEC data for the new redundancy level using the session information, the sending technique is not limited thereto. For example, the FEC data for the new redundancy level may be sent using a message having a different format.

Note that the redundancy level may be determined at predetermined intervals or at any point in time in accordance with the network status or the reception status of a receiver report.

An exemplary flow of the process performed by the receiving apparatus 102 is described next with reference to a flowchart illustrated in FIG. 5.

Figure 5:
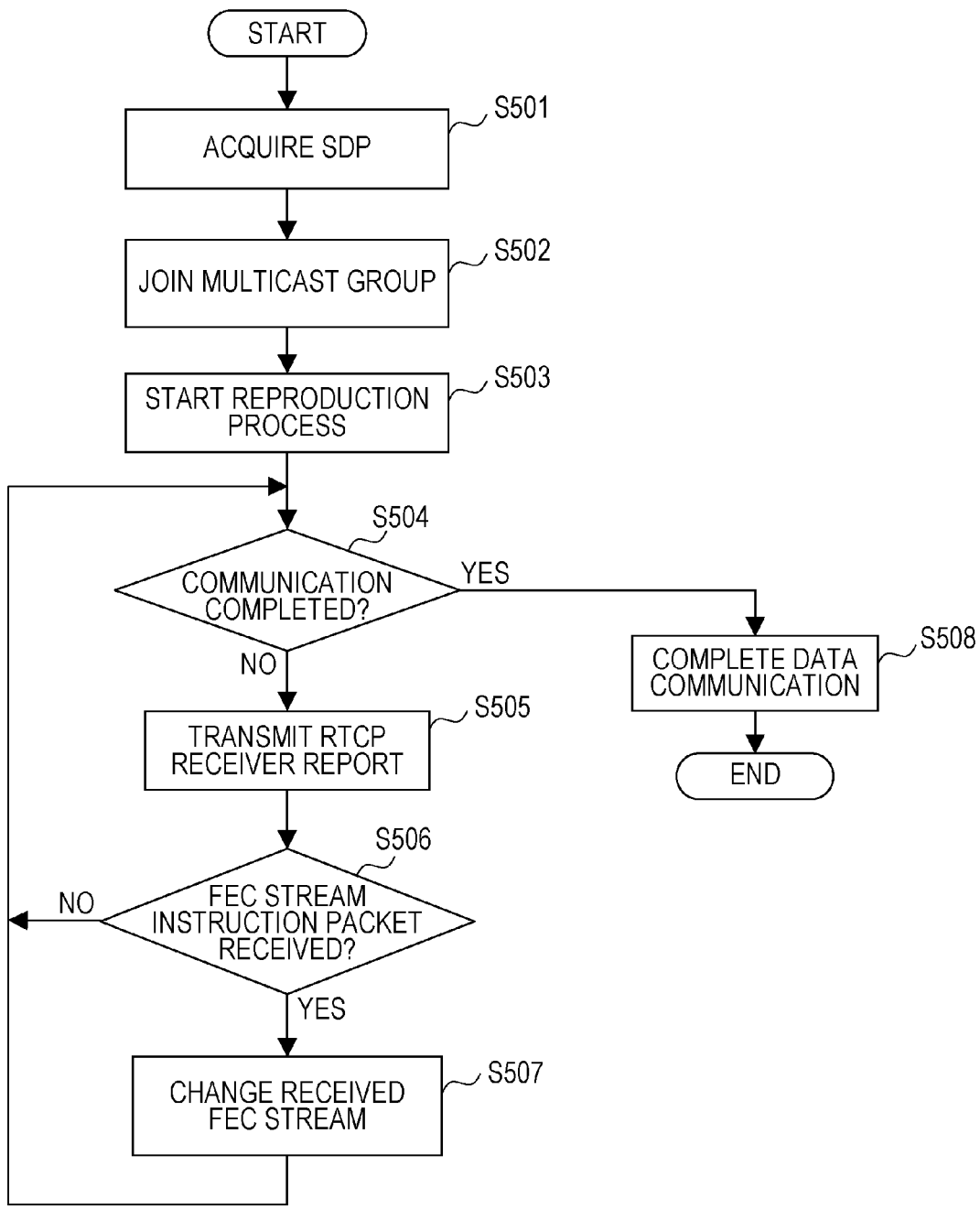
FIG. 5 is a flowchart of a process performed by the receiving apparatus.

FIG. 5 is a flowchart illustrating the flow of processes performed by the receiving apparatus 102. The processes illustrated in FIG. 5 are realized by a CPU of the receiving apparatus 102 that loads a program for the processes illustrated in FIG. 5 from a ROM to a RAM and executes the program. However, at least some of the processes illustrated in FIG. 5 can be executed by dedicated hardware. The transmitting and receiving unit 109 of the receiving apparatus 102 acquires, from the distribution apparatus 101, SDP information including the description of the session information for receiving data distributed via multicast (step S501). The transmitting and receiving unit 107 of the distribution apparatus 101 transmits the session information in response to a request sent from the receiving apparatus 102.

In order to acquire the SDP information, a method using RTSP or a method using FTP or HTTP can be employed.

The transmitting and receiving unit 109 determines multicast data to be received using the session information stored in the acquired SDP information and joins the multicast group (step S502).

After the transmitting and receiving unit 109 joins the multicast group, the reproduction control unit 113 performs a reproduction process of the multicast packets transmitted from the distribution apparatus 101 (step S503).

The transmitting and receiving unit 109 determines whether receipt of the data distributed via multicast is completed (step S504). If it is determined that receipt of the data is completed, the transmitting and receiving unit 109 completes receipt of the data and performs a completion process for the reproduction process (step S508). Thus, the processing illustrated in FIG. 5 is completed.

However, if it is determined that receipt of the data is not completed, the reception status analyzing unit 111 generates a receiver report of RTCP and transmits the receiver report to the multicast address (step S505). The distribution apparatus 101 can receive the receiver report transmitted to the multicast address. The multicast address is included in the SDP information acquired in step S501. In the example illustrated in FIG. 3, the multicast address is included in the content information 301. The address is 224.2.0.1, the TTL is 32, and the port is 5001. Note that according to the present exemplary embodiment, the reception status analyzing unit 111 generates the receiver report at predetermined intervals. Upon receiving a packet of the session information for identifying the FEC data from the distribution apparatus 101 (step S506), the receiving apparatus 102 updates the received FEC data to the FEC data identified by the session information (step S507).

Note that the process in step S506 can be performed at any point in time. For example, the process in step S506 may be performed prior to the process of step S505.

As described above, according to the present exemplary embodiment, the distribution apparatus 101 generates the FEC data for the redundancy corresponding to the data reception status of the receiving apparatus 102 that receives content data distributed via multicast. Thereafter, the distribution apparatus 101 sends, to the receiving apparatus 102, the session information for identifying the generated FEC data. The receiving apparatus 102 receives the content data distributed via multicast and sends the reception status of the data to the distribution apparatus 101. In addition, the receiving apparatus 102 receives the FEC data identified using the session information sent from the distribution apparatus 101.

In this way, the distribution apparatus 101 can reduce the load for generating the FEC data. In addition, the receiving apparatus 102 can receive the FEC data corresponding to the redundancy in accordance with the reception status of data distributed via multicast.

Second Exemplary Embodiment

A second exemplary embodiment is described next. In particular, the differences from the first exemplary embodiments are described. In the second exemplary embodiment, a plurality of methods can be used as the error correction encoding method.

Examples of an existing error correction encoding method include an exclusive OR (XOR) operation and Reed-Solomon code.

According to the present exemplary embodiment, the error correction encoding unit 104 of the distribution apparatus 101 can generate FEC data using an encoding method 1 (exclusive OR) and an encoding method 2 (Reed-Solomon code). Note that in the receiving apparatus 102 according to the present exemplary embodiment, the encoding method 2 (a second method) requires the amount of computation larger than that of the encoding method 1 (a first method) when data is decoded. In addition, the amount of recoverable data is larger than that of the encoding method 1. However, the error correction encoding method used for generating FEC is not limited to the above-described two methods.

Note that, according to the present exemplary embodiment, one of a receiving apparatus corresponding to the encoding method 1, a receiving apparatus corresponding to the encoding method 2, and a receiving apparatus corresponding to both the encoding methods 1 and 2 can be used as the receiving apparatus 102.

According to the present exemplary embodiment, the redundancy control unit 105 sends, to the receiving apparatus 102, the session information including identification information used for identifying FEC data generated using the encoding method 1 and the FEC data generated using the encoding method 2. The receiving apparatus 102 receives the FEC data more suitable for the receiving apparatus 102 using the identification information included in the received session information. In this way, the receiving apparatus 102 can receive the FEC data that matches the processing power and the functions of the receiving apparatus 102.

FIG. 6 illustrates an example of the session information generated by the redundancy control unit 105 according to the present exemplary embodiment. Note that according to the present exemplary embodiment, like the first exemplary embodiment, the redundancy control unit 105 sends the session information using SET_PARAMETER.

As illustrated in FIG. 6, the session information includes content information 601 and two FEC information items 602 and 603. The content information 601 indicates H. 264 content data. The FEC information item 602 is information for identifying FEC data 1 generated using the encoding method 1. The FEC information item 603 is information for identifying FEC data 2 generated using the encoding method 2. Note that the FEC data 1 and the FEC data 2 are generated using the content data corresponding to the content information 601. That is, the FEC information 602 and 603 correspond to the methods for generating the FEC data.

Upon receiving the session information as illustrated in FIG. 6, the receiving apparatus 102 determines the FEC data item to be received from two FEC data items identified by the FEC information items 602 and 603. For example, the receiving apparatus 102 selects the FEC data item generated using the encoding method that the receiving apparatus 102 can support. Alternatively, for example, if the receiving apparatus 102 can support both the encoding methods 1 and 2, the receiving apparatus 102 selects, as an FEC data item to be received, the FEC data item that matches the current data reception status or the processing load of the packet recovery unit 112.

In addition, according to the present exemplary embodiment, the receiving apparatus 102 sends, to the distribution apparatus 101, the type of FEC data item selected as the FEC data item to be received using the receiver report.

FIG. 7 illustrates an example of the receiver report. According to the present exemplary embodiment, the receiving apparatus 102 stores identification information in the field for the profile dependency extension 703, which is an extended field of the receiver report. The stored information is used by the distribution apparatus 101 in order to identify the type of received FEC data. By referencing the profile dependency extension 703 included in the receiver report received from the receiving apparatus 102, the distribution apparatus 101 can identify the FEC data that the receiving apparatus 102 is receiving. In addition, according to the present exemplary embodiment, if, for example, the identification information for the FEC data of the encoding method 2 is not included in the receiver report from the receiving apparatus 102 that receives the content data distributed via multicast, the error correction encoding unit 104 does not generate the FEC data of the encoding method 2. That is, if all of the receiving apparatuses 102 that receive multicast distribution data receive the FEC data of the encoding method 1, the error correction encoding unit 104 does not generate the FEC data of the encoding method 2. In this way, the load required for generating the FEC data can be reduced.

An exemplary process performed by the distribution apparatus 101 according to the present exemplary embodiment is described next. In particular, the differences from the first exemplary embodiment are described. The redundancy control unit 105 of the distribution apparatus 101 according to the present exemplary embodiment acquires the packet loss ratio of the receiving apparatus 102 from the receiver report and acquires information regarding the FEC data received by the receiving apparatus 102 (step S405). Thereafter, the redundancy control unit 105 determines the redundancy for the type of FEC data received by the receiving apparatus 102 on the basis of the packet loss ratio (step S406).

For example, when one of the receiving apparatuses 102 receives the FEC data of the encoding method 1 and if the packet loss ratio is a first loss ratio, the redundancy control unit 105 determines the redundancy on the basis of the first loss ratio. That is, the determined redundancy varies depending on the encoding method of the FEC data received by the receiving apparatus 102.

The redundancy control unit 105 stores a combination of the encoding method of the FEC data received by the receiving apparatus 102 and the determined redundancy for each of the receiving apparatuses 102.

If, in step S408, it is determined that the redundancy level differs from the current redundancy level, the error correction encoding unit 104 generates the session information including the FEC information 302 indicating the FEC data for the new redundancy level. Thereafter, the generated session information is transmitted to the receiving apparatus 102 (step S409). The transmitted session information does not include one of the FEC information items 602 and 603 corresponding to the FEC data that is not received by the receiving apparatus 102. However, by embedding, into the session information, the FEC information corresponding to the encoding method that differs from the encoding method of the FEC data received by the receiving apparatus 102, the receiving apparatus 102 can change the encoding method of the FEC data during communication.

As illustrated in FIG. 5, in step S502, the receiving apparatus 102 selects the FEC data item to be received from among the FEC data items of a plurality of encoding methods. In addition, the receiving apparatus 102 sends, to the distribution apparatus 101, the type of FEC data item selected as the FEC data item to be received using the receiver report.

According to the present exemplary embodiment, the distribution apparatus 101 can be configured so as not to change the encoding method after the encoding method has been determined or so as to change the encoding method during communication. That is, by transmitting the session information including a plurality of FEC information items to the receiving apparatus 102, the distribution apparatus 101 can cause the receiving apparatus 102 to select an encoding method that differs from the encoding method previously selected by the receiving apparatus 102.

While the present exemplary embodiment has been described with reference to two types of encoding method, three types of encoding method or more can be employed. In addition, according to the present exemplary embodiment, the distribution apparatus 101 does not generate FEC data that is not received by the receiving apparatus 102. That is, the redundancy control unit 105 identifies the encoding method and the redundancy level of the FEC data being received by each of the receiving apparatuses 102 by referencing the receiver reports received from the receiving apparatuses 102. Thereafter, the distribution apparatus 101 instructs the error correction encoding unit 104 not to generate the FEC data for the encoding method and the redundancy level that are not employed by any one of the receiving apparatuses 102. By doing so, the load required for generating the FEC data can be reduced.

Note that the distribution apparatus 101 can perform multicast distribution in advance before the receiving apparatus 102 starts receiving data. However, the distribution apparatus 101 may start multicast distribution in response to a request from the receiving apparatus 102. If multicast distribution is started in response to a request from the receiving apparatus 102, the communication band can be more efficiently used. In addition, by generating the FEC data in response to receipt of the receiver report from the receiving apparatus 102, the distribution apparatus 101 can use the communication band more efficiently.

In order to send a request for multicast distribution when the distribution apparatus 101 does not distribute data via multicast, the receiving apparatus 102 can use, for example, the following two methods. In a first method, the receiving apparatus 102 acquires SDP information using, for example, an HTTP or FTP protocol in advance and requests multicast distribution. In a second method, the receiving apparatus 102 acquires SDP information during a series of processes for starting streaming requested in RTSP.

The receiving apparatus 102 acquires SDP information using one of the above-described methods and requests multicast distribution by specifying content information using the acquired SDP information. In this way, the communication band can be efficiently used.

In addition, when RTCP is used and if the receiving apparatus 102 sends a BYE packet in order to complete reception of data, the distribution apparatus 101 can recognize completion of the reception. However, if RTCP is not used or if the processing performed by the receiving apparatus 102 is abnormally terminated, the distribution apparatus 101 may continue to distribute the content data that is not received by any one of the receiving apparatuses 102 via multicast. Therefore, according to the present exemplary embodiment, if the distribution apparatus 101 does not receive a receiver report for a certain period of time, the distribution apparatus 101 determines that the receiving apparatuses 102 complete reception of data. Thereafter, the distribution apparatus 101 completes distribution of the content data and the FEC data that are not received by the receiving apparatuses 102. In this way, the communication band can be more efficiently used.

Note that the length of the certain period of time used for determining whether the receiving apparatus 102 has completed reception of data may be determined using the RTSP method when a session is started. Alternatively, the length of the certain period of time may be included in the SDP information and may be sent. Still alternatively, the length of the certain period of time may be determined on the basis of a transmission interval of a receiver report transmitted from the receiving apparatus 102.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-278567 filed Dec. 14, 2010, which is hereby incorporated by reference herein in its entirety.

What is claimed is:

1. A distribution apparatus including at least one processor communicatively-coupled to a memory for distributing content data items via multicast, comprising:
   a receiving unit configured to receive reception status information regarding a reception status of the content data items in a receiving apparatus that receives the content data items distributed via multicast;
   a generating unit configured to generate, in a case where first reception status information is received from a first reception apparatus that receives the content data items via multicast and second reception status information is received from a second reception apparatus that receives the content data items via multicast and an amount of unsuccessfully received data corresponding to the second reception status information is larger than an amount of unsuccessfully received data corresponding to the first reception status information, first recovery data used by the first receiving apparatus in recovering a content data item that is not successfully received among the content data items on the basis of the first reception status information received from the first receiving apparatus and generate second recovery data having an amount of recoverable data larger than that of the first recovery data and used by the second receiving apparatus in recovering a content data item that is not successfully received among the content data items on the basis of the second reception status information; and
   a distributing unit configured to distribute the generated first and second recovery data together with the content data items via multicast.

2. The distribution apparatus according to claim 1, further comprising:
   a sending unit configured to send, to the receiving apparatus, identification information for identifying the recovery data so that the receiving apparatus receives the recovery data distributed by the distributing unit via multicast.

3. The distribution apparatus according to claim 1, wherein the receiving unit receives a reception status information item from each of the first and second receiving apparatuses and a third receiving apparatus that receive the content data items distributed via multicast, and wherein a case where an amount of unsuccessfully received data indicated by the first reception status information received from the first receiving apparatus is smaller than a predetermined threshold value and each of an amount of unsuccessfully received data indicated by the second reception status information received from the second receiving apparatus and an amount of unsuccessfully received data indicated by third reception status information received from the third receiving apparatus is larger than the predetermined threshold value, the generating unit generates the first recovery data for the first receiving apparatus and generates the second recovery data for the second and third receiving apparatuses.

4. The distribution apparatus according to claim 1, wherein the receiving unit receives a reception status information item from each of the first and second receiving apparatuses and a third receiving apparatus that receive the content data items distributed via multicast, and wherein a case where an amount of unsuccessfully received data indicated by the first reception status information received from the first receiving apparatus is smaller than a predetermined threshold value and each of an amount of unsuccessfully received data indicated by the second reception status information received from the second receiving apparatus and an amount of unsuccessfully received data indicated by third reception status information received from the third receiving apparatus is larger than the predetermined threshold value, the generating unit generates the first recovery data for the first receiving apparatus and generates the second recovery data for the second and third receiving apparatuses, and wherein if the first receiving apparatus completes receiving the content data items distributed via multicast while the generating unit is generating the first recovery data for the first receiving apparatus and the second recovery data for the second and third receiving apparatuses, the generating unit stops generating the first recovery data.

5. The distribution apparatus according to claim 1, further comprising:
   a sending unit;
   wherein the generating unit is capable of generating recovery data using a first method and a second method in which an amount of computation of the receiving apparatus for recovering is larger than that in the first method and an amount of recoverable data of the recovery data is larger than that in the first method, and wherein the sending unit sends identification information for identifying the recovery data based on the first method and identification information for identifying the recovery data based on the second method so that the receiving apparatus that receives the content data items distributed via multicast selects one of the recovery data based on the first method and the recovery data based on the second method and receives the selected recovery data.

6. The distribution apparatus according to claim 1, further comprising:
   a sending unit; and
   an acquiring unit;
   wherein the generating unit is capable of generating recovery data using a first method and a second method in which an amount of computation of the receiving apparatus for recovering is larger than that in the first method and an amount of recoverable data of the recovery data is larger than that in the first method, and wherein the sending unit sends identification information for identifying the recovery data based on the first method and identification information for identifying the recovery data based on the second method so that the receiving apparatus that receives the content data items distributed via multicast selects one of the recovery data based on the first method and the recovery data based on the second method, and the acquiring unit acquires, from an extended region of a packet of the reception status information received by the receiving unit, identification information regarding the method for generating recovery data indicated by the receiving apparatus, and wherein if the identification information corresponding to the second method is not present in the identification information that indicates the method for generating recovery data and that is acquired by the acquiring unit from the reception status information of the receiving apparatus that receives the content data via multicast, the generating unit does not generate the recovery data for the second method.

7. A distribution method for use in a distribution apparatus for distributing content data items via multicast, the method comprising the steps of:
   receiving reception status information regarding a reception status of the content data items in a receiving apparatus that receives the content data items distributed via multicast;
   generating, in a case where first reception status information is received from a first reception apparatus that receives the content data items via multicast and second reception status information is received from a second reception apparatus that receives the content data items via multicast and an amount of unsuccessfully received data corresponding to the second reception status information is larger than an amount of unsuccessfully received data corresponding to the first reception status information, first recovery data used by the first receiving apparatus in recovering a content data item that is not successfully received among the content data items on the basis of the first reception status information received from the first receiving apparatus and generating second recovery data having an amount of recoverable data larger than the that of the first recovery data and used by the second receiving apparatus in recovering a content data item that is not successfully received among the content data items on the basis of the second reception status information; and distributing the generated first and second recovery data via multicast together with the content data items.

8. The method according to claim 7, further comprising the step of sending, to the receiving apparatus, identification information for identifying the recovery data so that the receiving apparatus receives the recovery data distributed by the distributing unit via multicast.

9. A computer-readable recording medium storing:

a program for causing a computer for distributing content data items via multicast to perform the steps of receiving reception status information regarding a reception status of the content data items in a receiving apparatus that receives the content data items distributed via multicast, generating, in a case where first reception status information is received from a first reception apparatus that receives the content data items via multicast and second reception status information is received from a second reception apparatus that receives the content data items via multicast and an amount of unsuccessfully received data corresponding to the second reception status information is larger than an amount of unsuccessfully received data corresponding to the first reception status information, first recovery data used by the first receiving apparatus in recovering a content data item that is not successfully received among the content data items on the basis of the first reception status information received from the first receiving apparatus and generating second recovery data having an amount of recoverable data larger than the that of the first recovery data and used by the second receiving apparatus in recovering a content data item that is not successfully received among the content data items on the basis of the second reception status information, and distributing the generated first and second recovery data via multicast together with the content data items.

10. The medium according to claim 9, further comprising a program for causing the computer to perform the step of sending, to the receiving apparatus, identification information for identifying the recovery data so that the receiving apparatus receives the recovery data distributed by the distributing unit via multicast.

* * * * *